United States Patent [19]

Cesaro et al.

[11] Patent Number: 5,495,526

[45] Date of Patent: Feb. 27, 1996

[54] TONE-DETECTION METHOD FOR DETECTING AT LEAST ONE TONE IN A DUAL-TONE MULTIFREQUENCY SIGNAL, CALL-PROGRESS METHOD USING THE SAME

[75] Inventors: Claude Cesaro, Le Cannet; Gerard Richter, Saint-Jeannet, both of France

[73] Assignee: International Business Machines Corporation, Armonk, N.Y.

[21] Appl. No.: 202,601

[22] Filed: Feb. 28, 1994

[30] Foreign Application Priority Data

Apr. 29, 1993 [EP] European Pat. Off. ............. 93480050

[51] Int. Cl.⁶ .................................................. H04M 1/00
[52] U.S. Cl. .......................... 379/386; 379/351; 379/282; 379/283
[58] Field of Search ..................... 379/386, 351, 379/100, 112, 282, 283, 284, 285, 202, 215; 381/43, 44, 45, 46

[56] References Cited

U.S. PATENT DOCUMENTS

| | | | |
|---|---|---|---|
| 4,042,788 | 8/1977 | Richards | 379/283 |
| 4,667,065 | 5/1987 | Bangerter | 379/351 |
| 4,979,214 | 12/1990 | Hamilton | 381/46 |
| 5,307,404 | 4/1994 | Yatsunami | 379/386 |
| 5,321,745 | 6/1994 | Drory et al. | 379/282 |
| 5,325,425 | 6/1994 | Novas et al. | 379/112 |

FOREIGN PATENT DOCUMENTS

| | | |
|---|---|---|
| 0228096 | 7/1987 | European Pat. Off. . |
| 0341128 | 11/1989 | European Pat. Off. . |

OTHER PUBLICATIONS

27th Midwest Symposium on Circuits and Systems pp. 258–260.

*Primary Examiner*—Jeffery A. Hofsass
*Assistant Examiner*—Jacques M. Saint-Surin

[57] ABSTRACT

A method for detecting the presence of single tone and dual tone signals compares a ratio r which equals the square of the maximum value of the received signal (A max) during a sampling period divided by a measure E of the energy to three different thresholds. If r is less than the first threshold (3) a single tone is indicated. If it is greater than the first but less than the second (5.2) a dual tone is indicated. When a single tone is indicated the received signal is subjected to a second order autoregressive process to determine the frequency of the single tone. If a dual tone is indicated the received signal is subjected to a fourth order autoregressive process to determine the frequencies of the dual tones.

9 Claims, 4 Drawing Sheets

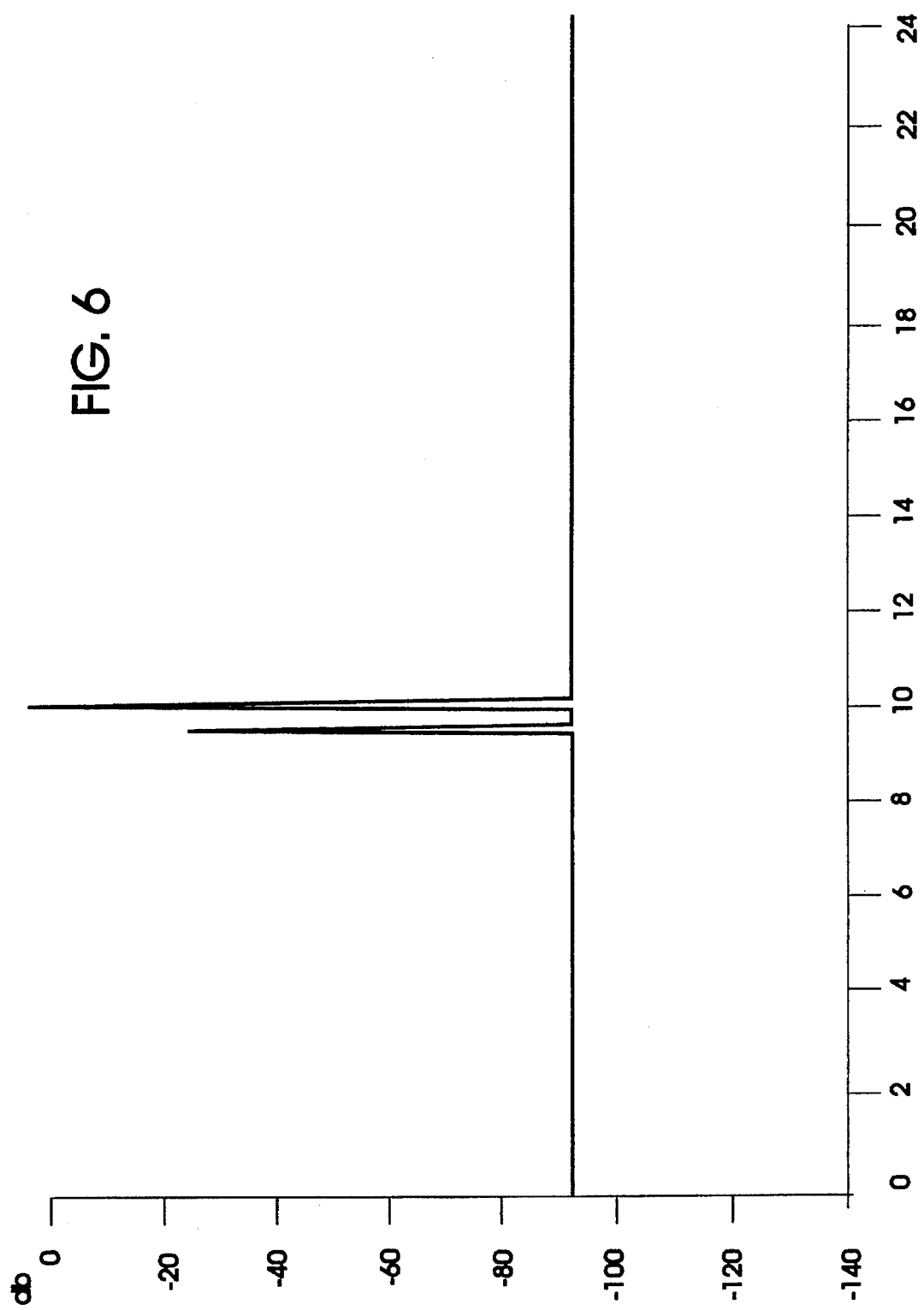

TONE-DETECTION METHOD FOR DETECTING AT LEAST ONE TONE IN A DUAL-TONE MULTIFREQUENCY SIGNAL, CALL-PROGRESS METHOD USING THE SAME

TECHNICAL FIELD

The invention relates to tone-detection and particularly to a method and apparatus for detecting the tones carried by the telephone lines.

BACKGROUND ART

Multiple tones are likely to be used in the telephones systems. Firstly, there are the various control and call status information which are commonly known as call progress tones which are typically transmitted by a central office and transmitted to a calling party in order to keep the latter informed of the current status of the call.

Secondly, the call may also be completed with the use of the Dual Tone, Multi-Frequency (DTMF) tones, particularly in use in advanced facsimile systems or also more sophisticated voice-server applications which rapidly develop, as in mail-order business or banking applications DTMF signal is a digital signal, being one of sixteen combinations of four frequencies from a high-frequency group and four frequencies from a low-frequency group, which is issued when a push button is depressed on the telephone and familiarly called a push tone or a dial tone.

FIG. 1 illustrates the general architecture of a voice-server application based on a voice-server system 101 which can be accessed by telephones 103 located anywhere in the country through the telephone network.

In addition to the necessity of handling the numerous call-progress tones which are likely to be found on the telephone line, the modern tone-detection systems must have a high level of discrimination since each of the multiples tones which are likely to be found on the network, e.g. the dial-tone, ring-back tone, busy tone, alerting tones, reorder tone, etc. . . has a different frequency value in each country.

Considering the common dial-tone signal: while the dial-tone signal has a frequency value of 440 Hz in France, the same consists of a 425 Hz tone having a specific cadence in Italy, and is a continuous tone made by combining signals having frequencies of 350 Hz and 440 Hz in the U.S.

Various digital tone detection systems exist in the art. Some are based on a sophisticated Fast Fourier Transformation (FFT), while others use digital band-pass filters which are adjusted at the desired frequencies to be detected. The former systems necessitate a great deal of digital processing resources and the latter can not easily adjusted to match the wide range of tones which exists in the different countries.

Therefore, there is a need in the industry for a simple call-progress method which can match with characteristics of the numerous telephone networks existing in the different countries.

SUMMARY OF THE INVENTION

The problem to be solved by the present invention is to provide a simple tone-detection method for a call-progress mechanism which allows an accurate detection of at least one tone in a received signal, and which still can be adjusted to match a wide variety of different frequency values.

This problem is solved by the tone-detection method according to the present invention which involves the steps of:

computing the value of the energy of the signal, processing said received signal to determine the existence of one or two tones in said signal, applying a second-order or fourth-order autoregressive process in response to said determination and performing a first estimation of the autoregressive parameters of said received signal, performing a digital band-pass filtering operation adjusted to the result of the estimation of said autoregressive parameters to provide a partial elimination of the noise existing on said received signal, reapplying a second-order or fourth-order autoregressive process in response to said determination and performing a final estimation of the autoregressive parameters of said received signal, computing the values of the frequencies of each tone from the value of said estimated parameters.

In the preferred embodiment of the invention, the determination whether one or two different tones actually exist in the received signal is achieved by the computation of the following ratio:

$$\frac{A_{max}^2}{E}$$

Since this ratio should be equal to 2 in the case of an unique tone and 4 in that of a dual-tone, the computation of the latter provides a simple way to determine the number of tones present in the signal.

Preferably, the first and final second-order autoregressive process are based on the predicting function having the z-transfer function:

$$\frac{1}{a_1 \times z^{-1} + a_2 \times z^{-2}}$$

and which is associated with a Least Mean Square algorithm continuously adapting the parameters of the predictor in a sense allowing the minimizing of an error signal.

In the preferred embodiment of the invention, the first and final fourth-order autoregressive process are based on the predicting function having the z-transfer function:

$$\frac{1}{a_1 \times z^{-1} + a_2 \times z^{-2} + a_3 \times z^{-3} + a_4 \times z^{-4}}$$

and also associated with a corresponding Least Mean Square algorithm.

Preferably, in order to decrease the DSP resources, and also to enhance the accuracy of the tone-detection mechanism, the second-order autoregressive process is performed with the value of a2 parameter being constantly fixed to −1. On the other hand, the fourth-order autoregressive process is performed with the values of a3 and a4 being respectively equal to a 1 and −1.

Preferably, the digital filtering operation, when an unique tone is to be processed, is based on a digital filter having the z-transfer function:

$$\frac{1}{1 - 2\mu \cos(2\Pi F \Delta t) \times z^{-1} + \mu^2 \times z^{-2}}$$

In the case of a dual-tone, the digital filtering operation is based on the following z-transfer function:

$$\frac{1}{1 - 2\mu \cos(2\Pi F_1 \Delta t)z^{-1} + \mu^2 z^{-2}} +$$

$$\frac{1}{1 - 2\mu \cos(2\Pi F_2 \Delta t)z^{-1} + \mu^2 z^{-2}}$$

As it will appear from the detailed description of the preferred embodiment of the invention, the method is particularly useful for processing DTMF signals and also in the voice-server applications.

DESCRIPTION OF THE DRAWINGS

FIG. 5 and FIG. 6 are respectively illustrative diagram showing the capability of a FFT based method and the method according to the present invention to distinguish two closely spaced tones.

DESCRIPTION OF THE PREFERRED EMBODIMENT OF THE INVENTION.

In the preferred embodiment of the invention, the tone-detection method provides the detection of the call-progress tones handled in a voice-server application based on a well-known RISC/6000 (trademark of IBM Corp,) host. The latter host computer is fitted with a particular voice-server application, such as banking or mail-order business applications. The host computer monitors several digital T1 or E1 links, what is achieved by means of specific cards providing the management of the primary digital links. Known cards for the RISC/6000 computer, which could advantageously embody the tone-detection method and call-progress mechanism according to the present invention, are known as "Voice-Server Card Adapter" and associated with "Voice pack" 9291 or 9295.

However, it should be understood that the invention is not limited to this specific host computer system and could be embodied in any telephone systems or voice-servers applications which must handle numerous existing tones. Basically, each of the above mentioned cards are provided with Digital Signal Processing resources for handling the communication tasks which are likely to be requested by the voice-server application. Among others, these processing tasks comprise, in addition to the traditional DTMF and call-progress management functions, compression and decompression algorithms allowing to limit the size of the storage required for storing the numerous prompt messages used in the general application program running in the host computer, voice-recognition algorithm, echo-cancellation operations.

With respect to FIG. 2, it will be described the technical steps which are involved in the tone-detection process according to the present invention which provide the easy discrimination between two closely related tones. Firstly, a scaling step 200 which is based on a traditional and basic μ or A law conversion is performed on the 64 Kbps digitized signal being received from the T1 or E1 digital linI. This eventually provides a twelve bit PMC sample stream at 8 Khz. This μ or A law conversion process is well-known in the art and will not be described with further details.

Figure 2:
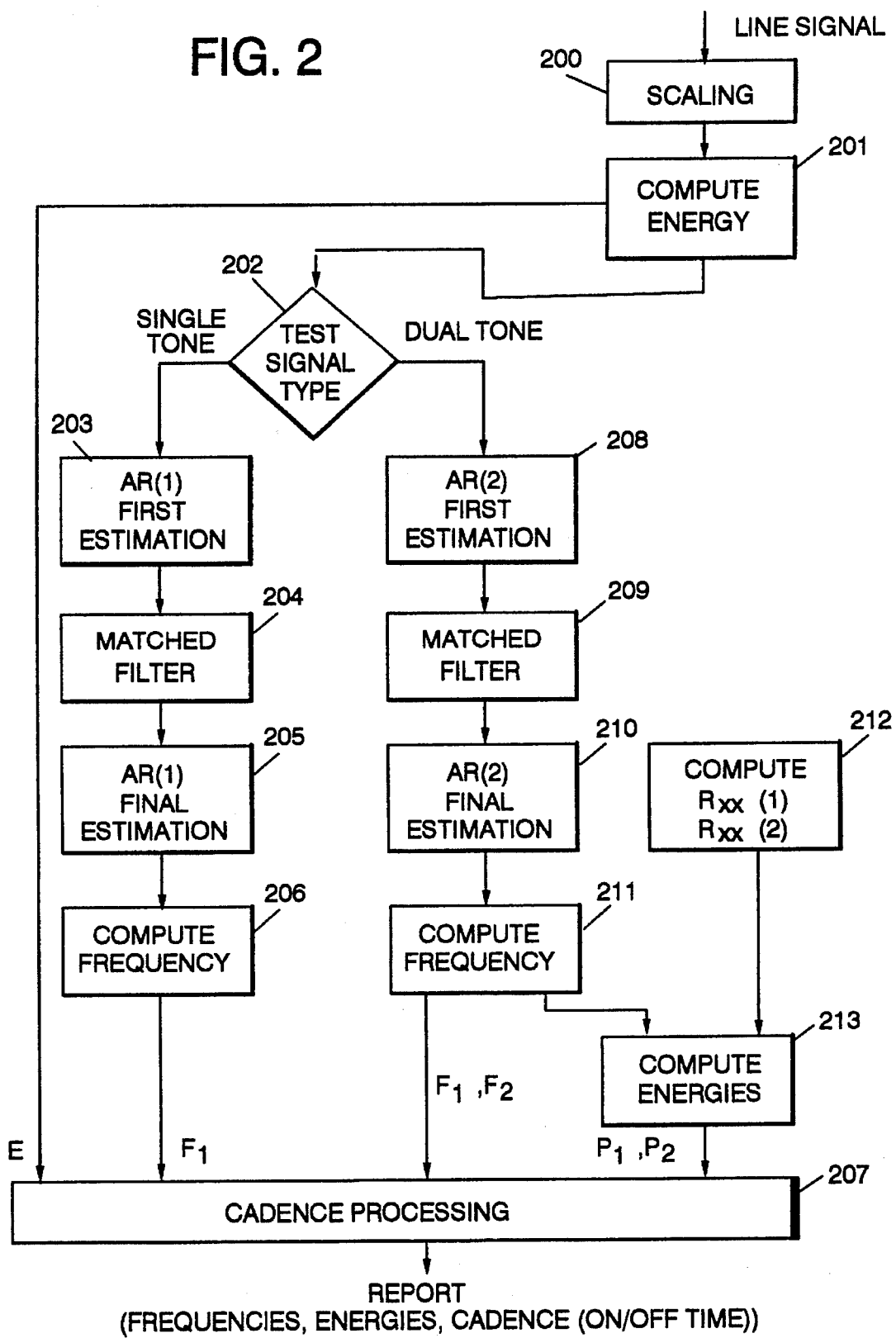
FIG. 2 shows the basic steps of the tone-detection process according to the present invention.

Then, as illustrated in FIG. 2, the energy of the PCM sample stream is computed, step 201. To achieve this, the digital processing means computes the mean square value of the PCM samples. Then, step 202, a test is performed to determine the type of the received signal, that is to say whether the signal comprises an unique tone or two distinctive tones. In the present invention, this test is performed by a computation of the ratio:

$$\frac{A_{max}^2}{E}$$

where Amax represents the maximum value of the received signal and E the computed measure of the energy. When the signal comprises an unique sinusoidal tone, it appears that the latter ratio is equal to 2, while the same reaches the value "4" in the case of two different tones. Also, it should be noticed that the value of this ratio does not depend on the value of the frequencies of the tones. Therefore, in step 202, if the computed ratio is found to be inferior to 3, then the algorithm will conclude that an unique single tone is present in the received signal. On the contrary, if the algorithm finds that the ratio is superior to 3, then it will conclude of the existence of a double tone in the received signal.

Alternatively, in another preferred embodiment of the invention, test 202 additionally provides the detection of any voice activity existing on the line. This is particularly described in copending patent application entitled "Voice activity detection method", filed on the day of filing of the present application, assigned to the assignee of the present application, and which contents is incorporated in the present description by simple reference.

Figure 1:
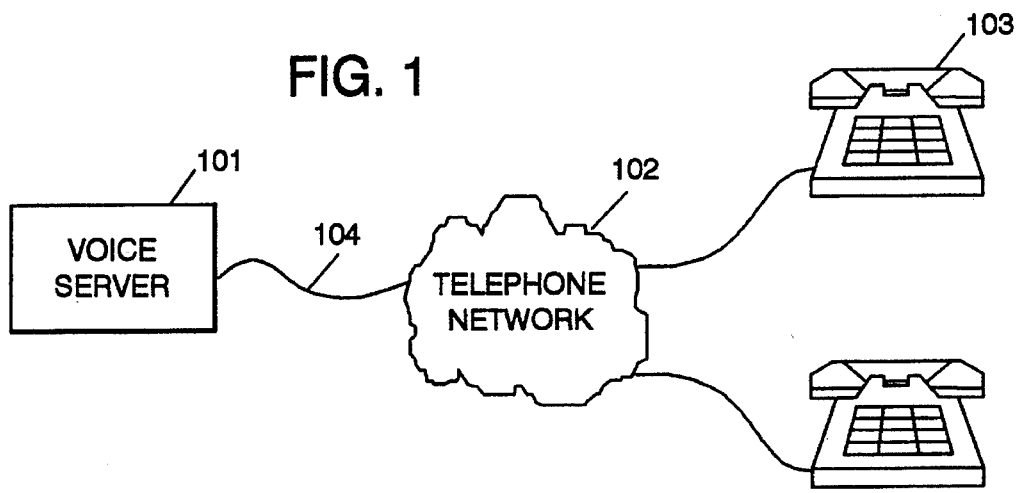
FIG. 1 is a schematic diagram of a voice-server application which can advantageously incorporate the tone-detection process according to the present invention.
Figure 3:
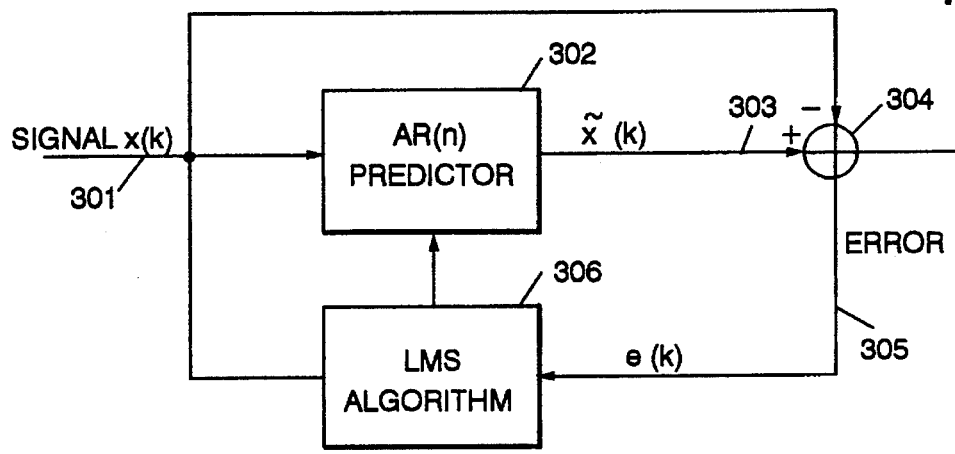
FIG. 3 details the principle of the auto-regressive modelization of the signal in accordance with the present invention.

In the case of the detection of a single tone in the received signal, the process proceeds to step 203 where a first estimation of the autoregressive parameters of the signal is performed. This is performed by means of a second-order autoregressive process which is illustrated in the block diagram of FIG. 3.

As illustrated, an AutoRegressive (AR) predictor block 302 provides the estimated signal. It is characterized by the following z-transfer function:

$$\frac{1}{a_1 \times z^{-1} + a_2 \times z^{-2}}$$

A substractor 304 computes the value of the error between the estimated value of $\tilde{x}$, and the received signal x. A least Mean Square block (LMS) 302 receiving the signal x and the estimated value of the error continuously adapts the value of the a 1 parameter so that to minimize the estimated error. Since the signal received is supposed to be a sinusoidal tone, the a2 parameter is assumed to be equal to −1, and the autoregressive process is continuously performed with parameter a2 being equal to −1. This substantially minimizes the processing resources required for the AR algorithm and also increases the accuracy of the calculation on the a1 parameter.

The equation of the LMS block 302 is the following:

$$a_1(k+1) = a_1(k) + \beta \times e(k) \times x(k-1)$$

In the preferred embodiment of the invention, good results are particularly obtained when the value of beta is computed as follows:

$$\beta = \frac{\beta_0}{E}$$

where $\beta_o$ is a constant, and E is the value of the energy which was compute, d above.

With respect to FIG. 2 again, step 203 produces a first estimation of autoregressive parameter $a_1$ of the received signal, as described with details above. Then, step 204, the process performs a digital band-pass filtering which is adjusted around the frequency of the tone which has been determined in step 203. The filtering process of step 204 is based on a first-order digital filter, which characteristics is adjusted so that to eliminate the most part of the noise signal existing around the detected tone. In the preferred embodiment of the invention, the first-order band pass filter is based on the following z-transfer function:

$$\frac{1}{1 - 2\mu \cos(2\Pi F \Delta t) \times z^{-1} + \mu^2 \times z^{-2}}$$

with $\mu$ being a parameter; characterizing the selectivity of the filter. Preferably, this parameter has a value which is close to 1 so that to provide a high level of selectivity. In the preferred embodiment of the invention it is fixed to 0.92

It has been observed that this first-order filter substantially improves the tolerance of the overall algorithm to the noise, and eventually allows the processing of a signal having a degraded signal-to-noise ratio.

Then, step 205, a final estimation of the autoregressive parameters is performed. This is achieved by processing the filtered signal in accordance to the autoregressive block diagram of FIG. 3 which has been described with details below. Then, step 206, the value of the frequency is computed in accordance with the following equation:

$$a_1 = 2 \cos(2\Pi f \Delta t)$$

where $\Delta t$ corresponds to the sampling period.

Then, the process proceeds to cadence processing step 207 where the value and the duration of the tone is reported to the application program running in the host processor.

In the case where test of step 202 reveals the existence of dual tones in the received signal, then the; process proceeds to step 208 where a four-order autoregressive process is performed. Similarly than above, this new AR process is based on the block diagram of FIG. 3, where the AR predictor block 302 now consists in a four-order predictor with the following z-transfer function:

$$\frac{1}{a_1 \times z^{-1} + a_2 \times z^{-2} + a_3 \times z^{-3} + a_4 \times z^{-4}}$$

where "a1, a2, a3 and a4" are the four parameters of the autoregressive modelization of the signal. Similarly than above, since the dual tones are expected to be pure sinusoidal tones, the value of the a3 and a4 are constantly fixed to be equal to a1 and −1. This makes easier the computation of the AR algorithm and also increases the accuracy of the frequency computation.

In the process of step 208, the LMS block 302 is characterized by the following equation:

$$\begin{cases} a_1(k+1) = a_1(k) + \beta e(k)(x(k-1) + x(k-3)) \\ a_2(k+1) = a_2(k) + \beta e(k) \times x(k-2) \end{cases}$$

On the completion of the autoregressive process of step 208, a dual digital band-pass filtering is performed which is adjusted to match 204 the two frequencies which can be evaluated from the determination of the four above parameters. Similarly than above, this dual filtering is based on the combination of two first-order band-pass digital filters having the equation of:

$$\frac{1}{1 - 2\mu \cos(2\Pi F_1 \Delta t)z^{-1} + \mu^2 z^{-2}} +$$

$$\frac{1}{1 - 2\mu \cos(2\Pi F_2 \Delta t)z^{-1} + \mu^2 z^{-2}}$$

with $\mu$ being again a parameter characteristic of the selectivity of the filter.

Then, step 210, a final estimation of the autoregressive parameters is performed as described above for the step 205. the accurate values of the dual frequencies can eventually been performed in step 211 in accordance with the following equations:

$$\begin{cases} a_1 = 2(\cos(2\Pi F_1 \Delta t) + \cos(2\Pi F_2 \Delta t)) \\ a_2 = -2 - 4\cos(2\Pi F_1 \Delta t) \cos(2\Pi F_2 \Delta t) \end{cases}$$

Once computed, the values of the two frequencies can be reported to the cadence processing routines in step 207 and then handled by the general application program running in the host computer.

Also, the respective energies of the two tones are computed. This is firstly performed by means of a calculation of the autocorelation functions Rxx(1) and Rxx(2), step 212, in accordance with the well known relation:

$$R_{xx}(n) = \sum_{-\infty}^{+\infty} x(k) \times x(k+n)$$

Then, step 213, the following matricial equation is solved in order to compute the desired values P1 and P2 of the estimation of the energy of the two tones.

$$\begin{pmatrix} \cos 2\Pi F_1 \Delta t & \cos 2\Pi F_2 \Delta t \\ \cos 4\Pi F_1 \Delta t & \cos 4\Pi F_2 \Delta t \end{pmatrix} \begin{pmatrix} P_1 \\ P_2 \end{pmatrix} = \begin{pmatrix} R_{xx}(1) \\ R_{xx}(2) \end{pmatrix}$$

The computed values of P1 and P2 are then transmitted to the cadence processing functions in step 207. The knowledge of the values of the energies particularly facilitates the distinguishing of the periods where an actual(s) tone(s) exist(s) or not, and therefore improves the cadence processing operations of step 207.

Figure 4:
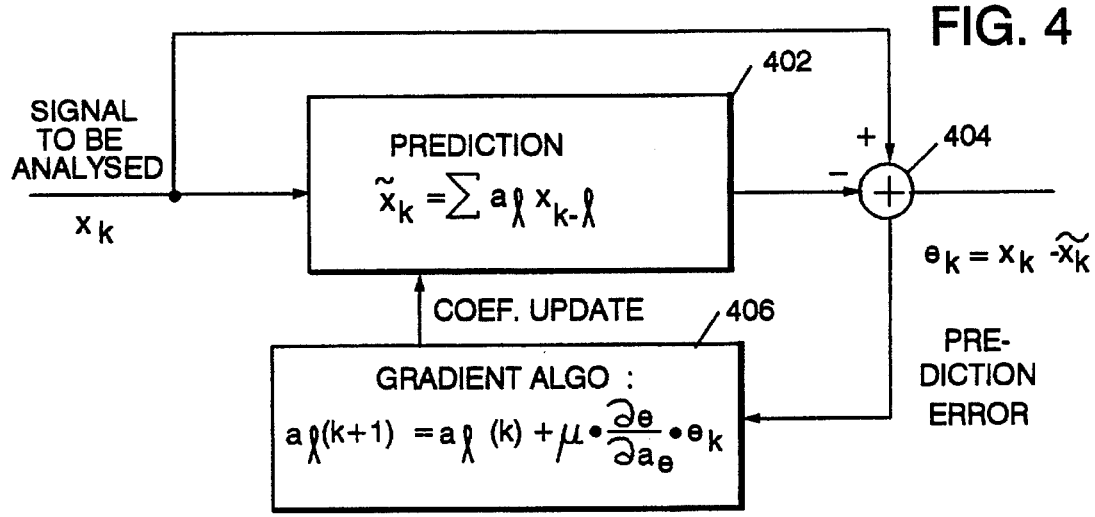
FIG. 4 is the principle of the auto-regressive algorithm in the case of n different tones.

FIG. 4 illustrates the Autoregressive process according to the present invention which provides the detection of n different tones in a received signal.

This is achieved by using using an AR block 402 based on the following equation:

$$x_k = \sum_{l=1}^{2p} a_l x_{k-1}$$

Similarly than above, the "a1" coefficients are determined by LMS block 406 which continuously update the coefficient so that to minimize the error in accordance with the general relation:

$$a_l(k+1) = a_l(k) + \mu \cdot x_{k-l} e_k$$

Then the frequency are determined by the research of the roots of tile equation:

$$z^{2p}+a_1 z^{2p-1}+\ldots+a_{2p}, \text{ with } n=1,\ldots,p \text{ and } a_i=a_{2p-i}$$

The Energies for each tone is calculated in accordance with the following formula, and which will then be reported to the cadence process step 207 for validation purpose:

$$\begin{pmatrix} \cos(2\Pi F_1 \Delta t) \ldots \cos(2\Pi F_p \Delta t) \\ \cdot \\ \cdot \\ \cos(4\Pi_p F_1 \Delta t) \ldots \cos(2\Pi F_p p \Delta t) \end{pmatrix} \begin{pmatrix} P_1 \\ \cdot \\ \cdot \\ P_p \end{pmatrix} = \begin{pmatrix} R_{xx}(1) \\ \cdot \\ \cdot \\ R_{xx}(p) \end{pmatrix}$$

Figure 5:
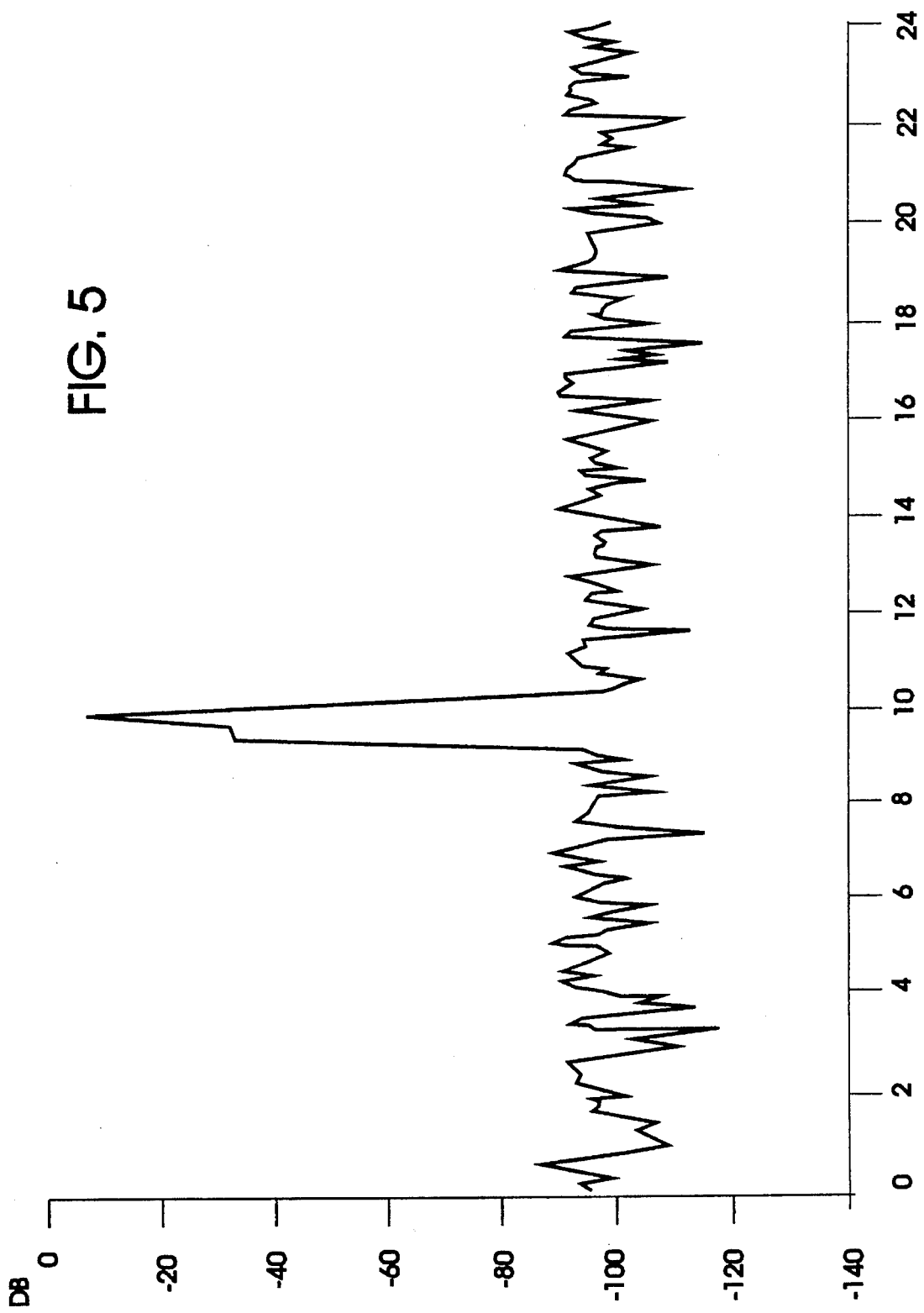

FIG. 5 and 6 are respectively simulation diagrams illustrating the high level of discrimination of the tone-detecting method in accordance with the present invention with respect to the traditional FFT transformation. As is appears from the FIG. 5, the tone-detection method according to the present invention, while necessitating a reduced amount de digital signal processing resources, nevertheless provides the clear distinction of two closely related tones in a received signal.

We claim:

1. A method for determining a presence of single tone multifrequency and dual tone multifrequency signals in signals provided over a telephone network including the following steps:

receiving the signals from the telephone network;

determining a maximum value A max of the received signal during a sampling window and a measure E of the energy;

computing a ratio, $$r = \frac{A^2 \max}{E}$$

comparing the said ratio r to a first threshold value and indicating receipt of a single tone signal when a value of the ratio r is less than the said first threshold value;

when reception of a single tone signal is indicated subjecting the received signal to a second order autoregressive process to obtain at least one estimate of autoregressive parameters of the received signal and at least one digital band-pass filtering operation adjusted by results of an estimate to remove noise components from the received signal and computing a frequency of the tone signal from a value of the estimated parameters;

comparing the said ratio r to a higher second threshold value when the ratio r exceed said first threshold value and indicating receipt of a dual tone signal when the ratio r is less than said second threshold value; and, when reception of a dual tone signal is indicated subjecting the received signal to a fourth order autoregressive process to obtain at least one estimate of the autoregressive parameters of the received signal and at least one digital band-pass filtering operation adjusted by the results of the estimate to remove noise components from the received signal and computing the frequencies of the received dual tones from the value of the estimated parameters.

2. A method according to claim 1 in which said first and second thresholds are 3 and 5.2, respectively.

3. Method according to claim 2 characterized in that, in response to the determination of unique tone signal, said second and fourth-order autoregressive process is based on a predicting function having the z-transfer equation:

$$\frac{1}{a_1 \times z^{-1} + a_2 \times z^{-2}}$$

and associated with a Least Mean Square algorithm which tends to adapt the autoregressive parameters of said predicting function so as to minimize an error resulting from the differences between said received signal and the estimated signal computed from said z-transfer function.

4. Method according to claim 3 characterized in that said second-order autoregressive process is performed with the value of a2 parameter being constantly fixed to −1.

5. Method according to claim 3 characterized in that, in response to the determination of an unique tone in said signal, said digital filtering operation is based on a digital filter having the z-transfer function:

$$\frac{1}{1 - 2\mu \cos(2\Pi F \Delta t) \times z^{-1} + \mu^2 \times z^{-2}}.$$

6. Method according to claim 5 characterized in that said "mu" parameter is fixed to a value comprised within a range of 0.90 and 0.95.

7. Method according to claim 2 characterized in that, in response to the determination of a dual-tone, said first and fourth-order autoregressive process is based on a predicting function having the z-transfer equation:

$$\frac{1}{a_1 \times z^{-1} + a_2 \times z^{-2} + a_3 \times z^{-3} + a_4 \times z^{-4}}$$

and associated with a Least Mean Square algorithm which tends to adapt the parameters of said predicting function so as to minimize the error resulting from the difference between said received signal and the estimated signal computed from said z-transfer function.

8. Method according to claim 7 characterized in that said fourth-order autoregressive process is performed with the value of a3 and a4 parameters being constantly fixed to a1 and −1.

9. Method according to claim 7 characterized in that, in response to the determination of a dual-tone in said signal, said digital filtering operation is based on a digital filter having the z-transfer function:

$$\frac{1}{1 - 2\mu \cos(2\Pi F_1 \Delta t) z^{-1} + \mu^2 z^{-2}} + \frac{1}{1 - 2\mu \cos(2\Pi F_2 \Delta t) z^{-1} + \mu^2 z^{-2}}.$$

* * * * *